United States Patent [19]

Kossmehl et al.

[11] Patent Number: 5,488,093
[45] Date of Patent: Jan. 30, 1996

[54] STIFF-CHAIN POLYESTERS AND A METHOD OF PREPARING THEM

[75] Inventors: Gerhard Kossmehl; Bettina Lundt, both of Berlin, Germany

[73] Assignee: Dainippon Ink and Chemicals, Inc., Tokyo, Japan

[21] Appl. No.: 411,307

[22] Filed: Mar. 27, 1995

[30] Foreign Application Priority Data

Mar. 31, 1994 [DE] Germany .......................... 44 11 361.7

[51] Int. Cl.[6] ................................................. C08G 63/18
[52] U.S. Cl. .................. 528/193; 528/176; 528/179; 528/190; 528/194; 528/219; 528/272; 528/294; 528/298; 528/302; 528/308; 528/308.6; 524/366; 524/380; 428/364
[58] Field of Search ..................... 528/176, 179, 528/180, 193, 194, 219, 272, 294, 298, 302, 308, 308.6; 524/366, 380; 428/364

[56] References Cited

U.S. PATENT DOCUMENTS

| | | | |
|---|---|---|---|
| 3,673,139 | 6/1972 | Hrach ........................... | 524/170 |
| 4,031,165 | 6/1977 | Saiki et al. ..................... | 525/444 |
| 4,395,534 | 7/1983 | Shimizu et al. ................ | 528/126 |
| 5,039,778 | 8/1991 | Dang et al. .................... | 528/183 |
| 5,041,522 | 8/1991 | Dang et al. .................... | 528/183 |
| 5,106,940 | 4/1992 | Dang et al. .................... | 528/183 |
| 5,136,012 | 8/1992 | Dang et al. .................... | 528/183 |

*Primary Examiner*—Samuel A. Acquah
*Attorney, Agent, or Firm*—Armstrong, Westerman, Hattori, McLeland & Naughton

[57] ABSTRACT

The description relates to novel liquid-crystalline polyesters containing the following repeating units: A having the formula:

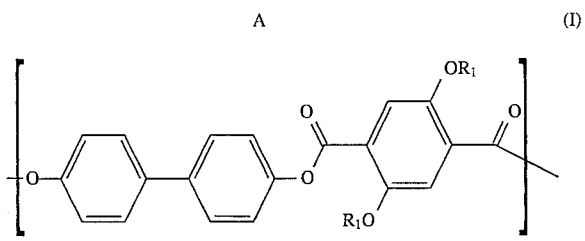

and B having the formula

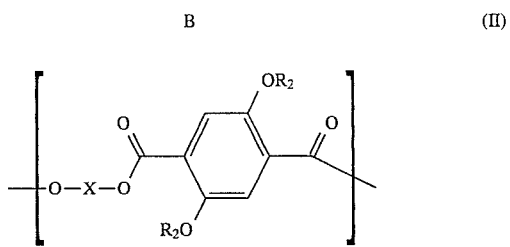

The novel polyesters are of use e.g. as starting materials for production of fibres with improved mechanical properties. They can either be converted as such into fibres or can be added to conventional fibre-forming matrix polymers.

18 Claims, No Drawings

STIFF-CHAIN POLYESTERS AND A METHOD OF PREPARING THEM

FIELD OF THE INVENTION

The invention relates to new stiff-chain polyesters capable of improving the mechanical properties of matrix polymers.

BACKGROUND OF THE INVENTION

Polyesters have long been known and are usually obtained by polycondensation of polyhydric alcohols with polyfunctional carboxylic acids. Recently, stiff-chain and liquid-crystalline aromatic polyesters have also become known. It is also known that these polymers can considerably improve the mechanical properties of matrix polymers when mixed therewith. For example *J. Appl. Polym. Sci.*, Volume 43, 157–173 (1991) describes mixed fibres made from polyethylene terephthalate (PET) and a thermotropically liquid-crystalline p-hydroxybenzoic acid/2,6-hydroxynaphthoic acid polyester. When this polyester is mixed with the PET fibre polymer, the result is an improvement in the mechanical properties such as the tensile stress and elastic modulus. However, the proportion of this polymer needs to be at least 10% by weight in order to improve the mechanical properties of the resulting mixed fibres.

SUMMARY OF THE INVENTION

The object of the invention is to prepare new stiff-chain or substantially stiff-chain polymers which can optionally be liquid-crystalline and which even in small proportions improve the mechanical properties of matrix polymers. They should melt without decomposition at the temperature for processing the matrix polymers and be soluble in ordinary organic solvents and compatible with the respective matrix polymer in the melt.

DETAILED DESCRIPTION OF THE INVENTION

According to the invention, this object is achieved by polyesters according to the claims.

The polyesters according to the invention consist of repeated units disposed in any sequence in the chain and each comprising a terephthaloylyl unit 2,5-disubstituted with n-pentyloxy or 3-methyl butyloxy radicals and a diol unit connected by ester bonds. In general the polyesters according to the invention comprise repeated units A

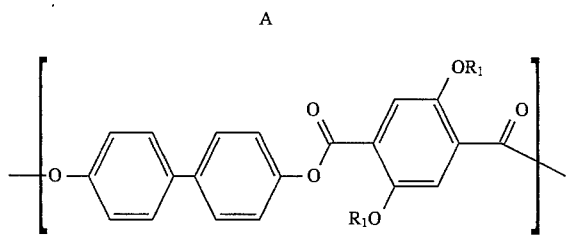

containing 4,4'-dioxybiphenylyl groups and at least one additional repeated unit B

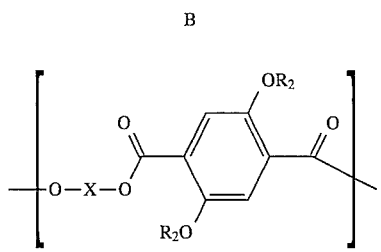

containing a grouping X different from 4,4'-dioxybiphenylyl.

Optionally a third repeated unit C

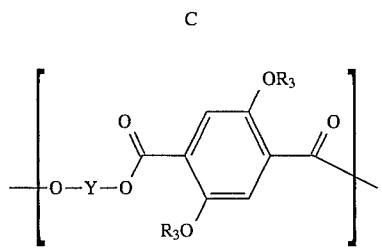

can be present and contain another grouping Y different from 4,4'-dioxybiphenylyl.

In the above formulae, X and Y denote the same or different aromatic or alicyclic hydrocarbon groups, particularly preferably 1,4-, 1,5-, 2,3-, 2,4-, 2,5-, 2,6-, or 2,7-disubstituted naphthalene groups, 1,4-disubstituted cyclohexyl groups or 2,5-disubstituted biphenyl groups or 2,2'-bis(4-phenylyl)propane, 2,2'-bis(4-phenylyl)methane, 2,2'-bis(4-phenylyl)oxide, 2,2'-bis(4-phenylyl)sulphide, 2,2'-bis(4-phenylyl)sulphone or 4,4'-stilbene diyl groups, and $R_1$ to $R_3$, which can be the same or different, each stand for an n-pentyloxy or 3-methyl butyloxy radical.

In the polyesters according to the invention, the repeated units A, B and optionally C are statistically distributed, the proportion of repeated units A being 1 to 99 mol % and the proportion of repeated units B alone or the sum of the repeated units B+C being 99 to 1 mol %. The average sum of the repeated units A, B and optionally C per polymer chain can be 20 to 200, preferably 50 to 150, one of the two terminal repeated units on the oxy group bearing a hydrogen atom and the other of the two terminal repeated units on the carbonyl group bearing a hydroxyl group. By way of example, formula IV gives the structure of a polyester according to the invention, prepared from 2,5-dipentyloxy terephthalic acid and a mixture, equimolar with the acid, of equal molar quantities of 4,4'-dihydroxy biphenyl and 1,5-dihydroxy naphthalene

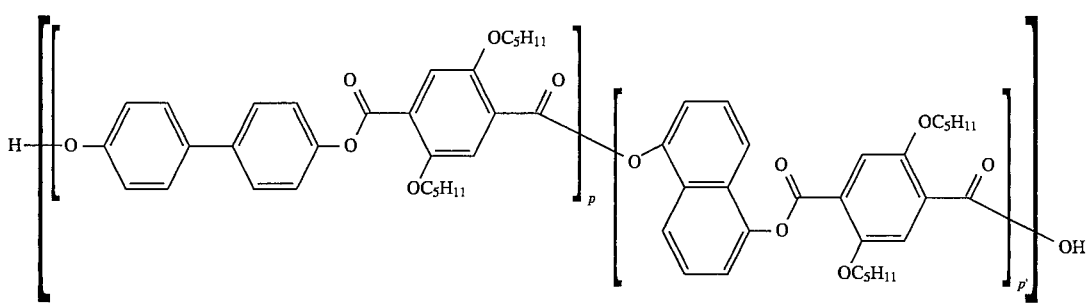

the average degree of polymerization, i.e. the sum of p and p', being an integer from 20 to 200, preferably 50 to 150. In the example shown, the polyester according to the invention consists of p repeated units A and p' repeated units B, the repeated units A and B being optionally statistically distributed as already stated.

The general structure of a polyester containing 4,4'-dioxybiphenylyl units and two additional divalent aromatic or cycloaliphatic units different from 4,4'-dioxybiphenylyl is shown in the general formula V As the preceding formulae show, the polyesters according to the invention are derived on the one hand from a 2,5-disubstituted terephthalic acid and an equimolecular quantity of a diol mixture, the diol mixture consisting of 4,4'-dihydroxybiphenyl (hereinafter called the main diol) and one or more of the following foreign diols: 1,4-dihydroxy naphthalene, 1,5-dihydroxy naphthalene, 2,3-dihydroxy naphthalene, 2,4-dihydroxy naphthalene, 2,5-dihydroxy naphthalene, 2,6-dihydroxy naphthalene, 2,7-dihydroxy naphthalene, 1,4-dihydroxy cyclohexane, 2,5-dihydroxy

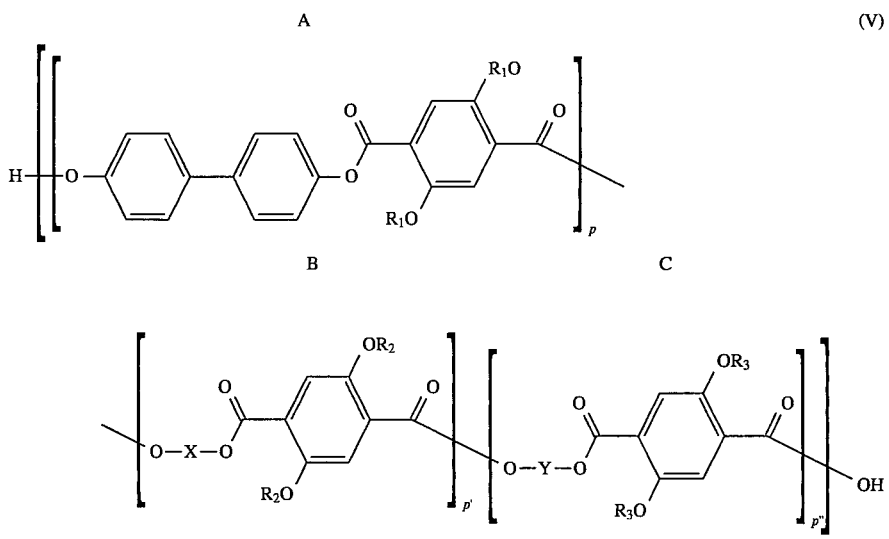

in which X stands for a radical derived from 1,4-, 1,5-, 2,3-, 2,5-, 2,6- or 2,7-dihydroxy naphthalene, 1,4-dihydroxyl cyclohexane or 2,5-dihydroxy biphenyl or 2,2'-bis(4-hydroxyphenyl)propane, 2,2'-bis(4-hydroxyphenyl)methane, 2,2'-bis(4-hydroxyphenyl)oxide, 2,2'-bis(4-hydroxyphenyl)sulphide, 2,2'-bis(4-hydroxyphenyl)sulphone or 4,4'-dihydroxystilbene and Y stands for a radical different from X and derived from 1,4-, 1,5-, 2,3-, 2,4-, 2,5-, 2,6- or 2,7-dihydroxynaphthalene, 1,4-dihydroxy cyclohexane, 2,5-dihydroxy diphenyl or 2,2'-bis(4-hydroxyphenyl)propane, 2,2'-bis( 4-hydroxyphenyl)methane, 2,2'-bis(4-hydroxyphenyl)oxide, 2,2'-bis(4-hydroxyphenyl)sulphide, 2,2'-bis(4-hydroxyphenyl)sulphone or 4,4'-dihydroxystilbene, and the average degree of polymerization, i.e. the sum of p+p'+p" is an integer from 20 to 200, preferably 50 to 150. In the above formulae, $R_1$, $R_2$ and $R_3$ have the meanings given previously.

The polymers according to the invention have a weight average molecular weight MW of 10,000 to 100,000, preferably 25,000 to 65,000.

biphenyl and 2,2'-bis(4-hydroxyphenyl)propane, 2,2'-bis(4-hydroxyphenyl)methane, 2,2'-bis(4-hydroxyphenyl)oxide, 2,2'-bis( 4-hydroxyphenyl)sulphide, 2,2'-bis(4-hydroxyphenyl)sulphone and 4,4'-dihydroxystilbene. The nature and molar proportion of the condensed diol can be varied to obtain polymers which melt between 100° and 300° C. and which surprisingly have fluid-crystal properties over a wide range of proportions of the condensed diol.

In principle, the polyesters according to the invention can be obtained by polycondensation of dicarboxylic acid components having the following general formula (VI)

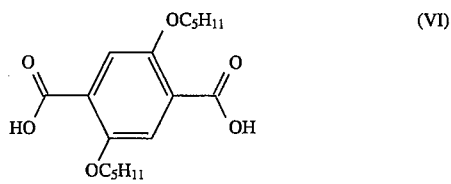

or acid chlorides thereof, in which the O—$C_5H_{11}$ radical can be either an n-pentyloxy or a 3-methyl butyloxy (isopentyloxy) group, with an equimolar quantity of a diol mixture consisting of 4,4'-dihydroxybiphenyl and one or more of the following foreign diols: 1,4-, 1,5-, 2,3-, 2,5-, 2,6- or 2,7-dihydroxynaphthalene, 1,4-dihydroxy cyclohexane, 2,5-dihydroxy biphenyl or 2,2'-bis(4-hydroxyphenyl)propane, 2,2'-bis(4-hydroxyphenyl)methane, 2,2'-bis(4-hydroxyphenyl)oxide, 2,2'-bis(4-hydroxyphenyl)sulphide, 2,2'-bis(4-hydroxyphenyl)sulphone and 4,4'-dihydroxystilbene. Between 1 and 99 mol % of the required quantity of 4,4'-dihydroxy biphenyl can be replaced by one or more of the aforementioned foreign diols.

Preferably the dicarboxylic acid components can be synthesized in accordance with the method of Claisen (L. Claisen, O. Eisleb, *Justus Liebigs Ann. Chem.*, 401, 29 (1919)) with subsequent splitting of ester, or in a modification of the method of Ballauff (M. Ballauff, *Makromol. Chem. Rapid Comm.*, 7, 407 (1986)). The starting substance is the 2,5-dihydroxyterephthalic acid diethyl ester, which is reacted with the corresponding bromopentane, potassium carbonate and potassium iodide by Claisen's method. Caustic potash solution is added to the intermediate product to saponify the ester groups.

The polyesters according to the invention can be manufactured basically by known methods, using the aforementioned 2,5-disubstituted terephthalic acids and the previously-described diols. Preferably, however, the polyesters according to the invention are produced by a modification of the method of Dicke and Lenz (H. R. Dicke, R. W. Lenz, *Angew. Chem.*, 131, 95–105 (1985)). The substituted terephthalic acid is reacted with thionyl chloride to form the acid dichloride. The resulting acid dichloride is dissolved in an inert solvent, e.g., in 3 ml/mmol acid chloride. The diol mixture in solid form is added to the resulting solution, together with sufficient pyridine to dissolve the mixture. Polycondensation is brought about in at least 24 hours and at temperatures of 60° to 250° C., preferably 80° to 150° C. The inert solvent is preferably a chlorinated hydrocarbon or a cyclic or non-cyclic ether having a suitable boiling-point. The solvent can e.g. be one of the following: 1,1,1,2-tetrachloroethane, 1,1,2,2-tetrachloroethane, tetrachloroethylene, dichloromethane, chloroform, tetrahydrofuran, 1,2-dimethoxy ethane, di- or triethylene glycol dimethyl ether, or the corresponding diethyl ethers.

The liquid-crystalline polymers according to the invention have a weight average molecular weight of 10,000 to 100,000, preferably 25,000 to 65,000.

Surprisingly, the polyesters according to the invention remain liquid-crystalline over a wide range of mixtures with diol, the maximum molar percentage content being e.g. 50% for condensed 2,3-dihydroxy naphthalene, 40% for 2,7-dihydroxy naphthalene, 80% for 1,5-dihydroxy naphthalene, 80% for 1,4-dihydroxy biphenyl and 70% of the total diol mixture in the case of 1,4-dihydroxy cyclohexane. If the content of foreign diol in the polymer chain is too large, there will be no liquid-crystalline phase (LC phase). If liquid-crystal properties are not desired, all the polyesters according to the invention can be prepared with foreign diol contents between 1 and 99 mol % in the diol mixture.

Even a low content of 10% foreign diol in the polymer chain reduces the melting-point by 100° C. If the content of foreign diol is further increased, the melting point continues to fall. The conversion temperature for the change from LC to isotropic (clarification temperature) also decreases with increase in the content of foreign diol in the polymer chain, but not as rapidly as the melting-point, so that the liquid-crystalline range is appreciably widened by introducing the foreign diols.

If the foreign diol comprises copolyesters with 1,5-dihydroxy naphthalene, a special situation occurs. Up to a content of 60% of 1,5-dihydroxy naphthalene, the copolyesters obtained have an enantiotropic LC phase, i.e. a liquid-crystalline phase occurs both on heating or on cooling. At a content of 80%, on the other hand, the resulting polymer has a monotropic liquid-crystalline phase, i.e. a liquid-crystalline phase occurs only on cooling. If there are no linear diols in the polymer chain (100% 1,5-dihydroxy naphthalene) the disturbance to the polymer chain is so great that no further liquid-crystalline phases are formed. On the other hand the liquid-crystalline properties of all polyesters according to the invention are retained even with low contents of 1 mol % of foreign diols.

All liquid-crystalline polyesters according to the invention have nematic textures under the polarization microscope.

The liquid-crystalline ranges of the polyesters are far below their decomposition temperatures, which is a considerable advantage over known polyesters such as unsubstituted or monosubstituted polyesters. They are therefore easy to work without decomposition. Another advantage is the usually wide LC range of about 100° C. above the melting-point. This simplifies processing and enables them to be used as additives to a number of matrix polymers.

Another advantage is that all polyesters according to the invention are soluble in conventional organic solvents such as chloroform, pyridine, DMF, dichloromethane or THF. The solubility increases with increasing content of foreign diol in the polymer chain.

The polyesters according to the invention can be added to any required thermoplastic polymers, provided the processing temperature range of the thermoplastic polymer coincides with the temperature range of the liquid-crystal phase of the polyester according to the invention and, more particularly, is below the decomposition temperature of the polyester according to the invention. One preferred example of a thermoplastic polymer capable of being modified by the polyesters according to the invention is polyethylene terephthalate (PET), particularly in fibre form.

The polyesters have a very good fibre-forming tendency. In the polyesters according to the invention derived from 2,7-dihydroxy naphthalene, the tendency is greatest when the content of foreign diols in the diol mixture with 4,4'-dihydroxybiphenyl is 20 to 60%. When the foreign diol is 2,3-dihydroxynaphthalene the tendency is particularly good if the content is 30 to 50%, or 20 to 60% in the case of 1,5-dihydroxynaphthalene, and when the foreign diol is 2,5-dihydroxyphenyl the tendency is particularly good when the content is 50 to 80%. The liquid-crystalline polyesters according to the invention have a very good fibre-forming tendency. They can be spun into fibres by themselves, or can e.g. be mixed as additives for improving the mechanical properties, such as the elastic modulus or tensile strength, of other matrix polymers. For economic reasons, however, such additives, even in small proportions, should produce a marked, substantial improvement in the mechanical properties of the matrix polymers. The reinforcing effects of the polyesters according to the invention were examined in detail using PET fibres as an example. This fibre material is relatively inexpensive but has the disadvantages of a high melting-point of 280° to 300° C. high viscosity in the melt and unsatisfactory mechanical properties such as low tensile strength and elastic modulus, so that it cannot be developed for many technical applications such as tire cord, ropes, belts or other industrial textiles.

The polyesters according to the invention can be added to the matrix polymers in various mixture ratios. For example the polyester/matrix polymer mixtures, relative to the total amount of mixture, contain 1 to 30 wt %, preferably 5 to 15 wt % of polyesters according to the invention and 70 to 99 wt %, preferably 85 to 95 wt % of matrix polymers, e.g, PET.

Suitable mixing processes are known to the skilled man and described e.g. in *Ullmanns Encyklopädie der technischen Chemie*, 4th Edition, Volume 2, pages 282 to 300. A mini-mixer described by S. Meretz, O. Mansmann, G. Hinrichsen in Comp. Sci. & Techn. 41, 179–192 (1991) is particularly good. For example the mixtures can be produced by intensive mixing in the melt at 280° to 300° C.

In the melt, the liquid-crystalline polyester/matrix polymer mixtures have very good flow properties, so that in the mixture they form very fine fibrils aligned in the fibre direction. There is also a marked reduction in the viscosity of the matrix polymer in the mixture.

The mixtures produced by using the polyesters according to the invention can be spun in conventional manner to form fibres. Suitable fibre-forming methods are described e.g. in *Ullmanns Encyklopädie der technischen Chemie*, 4th Edition, Volume 11, pages 264 to 275. The spinning results in highly oriented polyester fibrils aligned in the fibre direction and increasing the mechanical properties of the matrix polymer.

Since the mechanical properties of fibre and mixed fibres depend very closely on the conditions of fibre manufacture and are comparable to only a very limited extent, the tensile strength and elastic moduli of the mixed polyester/PET fibres were determined by comparison with pure PET fibres produced under the same conditions as the mixed fibres, in the form of averages of 15 to 30 individual fibre measurements. The average of 17 measurements of the tensile strength of pure PET fibres was 23.0 MPa and the elastic modulus was 750 MPa.

X-ray photographs of the mixed fibres show that the PET matrix is amorphous and non-oriented in all cases. The strengthening effect of the mixing fibres is therefore due to the formation of polyester fibrils aligned in the fibre direction, not to improved orientation of the PET.

Fibres from the mixtures used, which can contain 1 to 30%, preferably 5 to 15% of one or more of the polyesters according to the invention and 70 to 99%, preferably 85 to 95% PET, have appreciably improved mechanical properties as compared with pure PET fibres. Even at very low proportions of only a few per cent of the polyesters according to the invention in the mixture, the mixed fibres have mechanical properties many times superior to those of pure PET.

The invention will be described in detail with reference to the following examples.

EXAMPLES

EXAMPLE OF PREPARATION 1

A mixture of 25.4 g of 2,5-dihydroxy terephthalic acid diethyl ester, 30.0 g potassium carbonate, 1 g potassium iodide and 31.5 g 1-bromopentane was heated to boiling-point in cyclopentanone for at least 24 hours. The solvent was withdrawn and 250 ml of 5 wt % caustic potash and 20 ml ethanol was added to the residue, which was then heated to boiling-point for at least 24 hours. After cooling to room temperature the product was precipitated by acidifying with hydrochloric acid and was recrystallized from methylene chloride. 23.7 g of 2,5-bis(pentyloxy) terephthalic acid was obtained.

Melting-point (MP): 157° C. (Lit: 152° C.); yield: 23.7 g (70% of the theoretical). The structure of the carboxylic acid could be clearly demonstrated by spectroscopic analysis.

EXAMPLE OF PREPARATION 2

The procedure was as in Example 1, except that 1-bromo-3-methyl butane was used instead of 1-bromopentane. The resulting substance was 2,5-bis(3-methyl butyloxy) terephthalic acid [2,5-bis(isopentyloxy)terephthalic acid].

MP: 166° C. Yield: 17.3 g (51% of the theoretical). The structure of the carboxylic acid could be clearly demonstrated by spectroscopic analysis.

EXAMPLE OF PREPARATION 3

6 g of the 2,5-disubstituted terephthalic acid in Example 1 was dissolved in a 2–10 fold excess of thionyl chloride and reflux-heated in the presence of 1 ml pyridine for at least 24 hours. After cooling, the excess thionyl chloride was carefully distilled off at room temperature in vacuo. The last traces of thionyl chloride were withdrawn with heating. The yellow acid chloride was recrystallized from n-hexane, the purified product crystallizing out at temperatures below −5° C.

MP: 37° C. Yield: 5.9 g (91% of the theoretical). The structure of the acid chloride could be clearly demonstrated by spectroscopic analysis.

EXAMPLE OF PREPARATION 4

6 g of the 2,5-disubstituted terephthalic acid in Example 2 was dissolved in a 2–10 fold excess of thionyl chloride and reflux-heated in the presence of 1 ml pyridine for at least 24 hours. After cooling, the excess thionyl chloride was carefully distilled off at room temperature in vacuo. The last traces of thionyl chloride were withdrawn with heating. The yellow acid chloride was recrystallized from n-hexane, the purified produce crystallizing out at temperature below −5° C.

MP: 32° C. Yield: 5.8 g (89.3% of the theoretical). The structure of the acid chloride could be clearly demonstrated by spectroscopic analysis.

EXAMPLE OF PREPARATION 5

1.015 g (2.5 mmol) of the acid chloride in Example 3 was dissolved in 7.5 ml 1,1,2,2-tetrachloroethane at boiling-point. Next, the diol component, i.e. 120 mg (0.75 mmol) of 1,5-dihydroxy naphthalene and 325.5 mg (1.75 mmol) of 4,4'-dihydroxybiphenyl was added at once, together with 3 ml pyridine. After heating for 24 hours, the polymer was precipitated by pouring the reaction solution into methanol and was then re-precipitated. After repeated washing with methanol and water the product was dried in vacuo at 80° C., yielding a copolyester.

First melting: 196° C. Second melting: 212° C. (possible subsequent condensation). Appearance: white powder. Yield: 1.0 g (85% of the theoretical). Calculated: C 73.45, H 6.58. Found: C 72.16, H 6.62. GPC (weight-average) molecular weight: 54,300 g/mol in THE calibrated against polystyrene standards.

EXAMPLE OF PREPARATION 6

The procedure was as in Example 5, except that 160.0 mg (1.0 mmol) of 1,5-dihydroxynaphthalene and 279.0 mg (1.5 mmol) of 4,4-dihydroxybiphenyl were used.

MP: 175° C. Appearance: white powder. Yield: 0.98 g (75% of the theoretical). Calculated: C 73.35, H 6.58. Found: C 72.31, H 6.50. GPC molecular weight (weight-average)= 40,000 g/mol.

EXAMPLE OF PREPARATION 7

The procedure was as in Example 5, but using 80.0 mg (0.5 mmol) 2,7-dihydroxy naphthalene and 370 mg (2.0 mmol) 4,4'-dihydroxybiphenyl.

First melting: 230° C. 2nd melting: 235° C. (possible subsequent condensation). Appearance: beige powder. Yield: 1.15 g (83% of the theoretical). Calculated: C 73.55, H 6.59. Found: C 72.25, H 6.63. GPC molecular weight (weight-average): 34,000 g/mol.

EXAMPLE OF PREPARATION 8

The procedure was as in Example 5, but using 160.0 mg (1.0 mmol) of 2,7-dihydroxy naphthalene and 279.0 mg (1.5 mmol) of 4,4'-dihydroxybiphenyl.

MP: 200°–210° C. Appearance: beige powder. Yield: 1.0 g (78% of the theoretical). Calculated: C 73.35, H 6.58. Found: C 70.21, H 6.54. GPC molecular weight (weight-average): 47,700 g/mol.

EXAMPLE OF PREPARATION 9

The procedure was as in Example 5, but using 139.5 mg (0.75 mmol) of 2,5-dihydroxybiphenyl and 325.5 mg (1.75 mmol) of 4,4'-dihydroxybiphenyl.

First melting: 170° C. 2nd melting: 182° C. Appearance: grey powder. Yield: 1.1 g (82% of the theoretical). Calculated: C 73.75, H 6.60. Found: C 72.00, H 6.23. GPC molecular weight (weight-average): 24,000 g/mol.

EXAMPLE OF PREPARATION 10

The procedure was as in Example 5, but using 372.0 mg (2.0 mmol) of 2,5-dihydroxybiphenyl and 93.0 mg (0.5 mmol) of 4,4'-dihydroxybiphenyl.

MP: 99° C. Appearance: beige powder. Yield: 0.9 g (73% of the theoretical). Calculated: C 73.75, H 6.60. Found: C 72.45, H 6.5. GPC molecular weight (weight-average): 11,000 g/mol.

EXAMPLE OF PREPARATION 11

The procedure was as in Example 5, but using 160.0 mg (1.0 mmol) of 2,3-dihydroxy naphthalene and 279.0 mg (1.5 mmol) of 4,4'-dihydroxybiphenyl.

MP: 110° C. Appearance: white powder. Yield: 0.78 g (65% of the theoretical). Calculated: C 73.35, H 6.58. Found: C 72.43, H 6.65. GPC molecular weight (weight-average): 26,000 g/mol.

EXAMPLE OF PREPARATION 12

The procedure was as in Example 5, but using 120.0 mg (0.75 mmol) of 2,3-dihydroxynaphthalene and 325.5 mg (1.75 mmol) of 4,4'-dihydroxybiphenyl.

MP: 165° C. Appearance: white powder. Yield: 1.0 g (85% of the theoretical). Calculated: C 73.84, H 6.49. Found: C 71.63, H 6.34. GPC molecular weight (weight-average): 61,000 g/mol.

EXAMPLE OF PREPARATION 13

The procedure was as in Example 5, but using 40.0 mg (0.25 mmol) of 2,7-dihydroxy naphthalene, 40.0 mg (0.25 mmol) of 1,5-dihydroxynaphthalene and 372.0 mg (2.0 mmol) of 4,4'-dihydroxybiphenyl.

MP: 235° C. Yield: 1.0 g (78% of the theoretical). Appearance: white powder. Calculated: C 73.55, H 6.59. Found: C 72.95, H 6.63. GPC molecular weight (weight-average): 34,000 g/mol.

EXAMPLE OF APPLICATION 1

5 wt % of the copolymer ester obtained in Example 5 and prepared by reacting 2,5-bis(pentyloxy)-terephthalic acid chloride with a diol mixture of 70 mol % 4,4-dihydroxydiphenyl and 30 mol % 1,5-dihydroxy naphthalene, and 95 wt % of polyethylene terephthalate were mixed in the aforementioned mini-mixer and the melt was converted into mixed fibres. Next, the tensile strength and elastic modulus was determined as an average of 15 measurements in each case. The measurements showed a tensile strength of 68 MPa and an elastic modulus of 2600 MPa. These results show that addition of only 5 wt % of the copolyester according to the invention to polyethylene terephthalate increases the tensile strength of the resulting mixed fibres three-fold, with a 3.5-times increase in the elastic modulus, relative to the pure PET fibre.

EXAMPLE OF APPLICATION 2

As described in Example of application 1, measurements were made of the tensile strength and elastic modulus of a mixed fibre made from 95 wt % polyethylene terephthalate and 5 wt % of a polyester according to the invention produced from 2,5-bis(n-pentyloxy)terephthalic acid chloride and a diol mixture of 20 mol % 2,7-dihydroxy naphthalene and 80 mol % of 4,4'-dihydroxy biphenyl as described in Example of manufacture 7. The measurements showed a tensile strength of 35 MPa and an elastic modulus of 1500 MPa for the mixed fibre. Compared with the pure PET fibre, therefore, the mixed fibre had a 1.5 times higher tensile strength and at least twice the elastic modulus.

EXAMPLE OF APPLICATION 3

As described in Example of application 1, measurements were made of the tensile strength and elastic modulus of a mixed fibre of 15 wt % of the same polyester according to the invention as in Example of application 2 and 85 wt % polyethylene terephthalate. The measured tensile strength was 42 MPa and the elastic module was 2220 MPa for the mixed fibre. Consequently a 15% admixture of the polyester produces a three-fold increase in the elastic modulus and a 1.8 increase in tensile strength compared with the pure PET fibre.

COMPARATIVE EXAMPLE

Average of 15 to 30 individual measurements on fibres were obtained for the tensile strength and elastic moduli of pure PET fibres produced under the same conditions as the mixed fibres in Examples of application 1 to 3.

The average of 17 measurements on the pure PET fibres was a tensile strength of 23.0 MPa and an elastic modulus of 750 MPa.

What is claimed is:

1. A polyester characterized by comprising the following arranged in any desired sequence: repeated units A having the formula:

A (I)

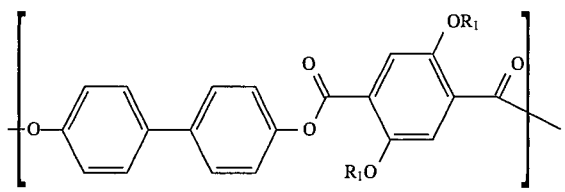

repeated units B having the formula:

B (II)

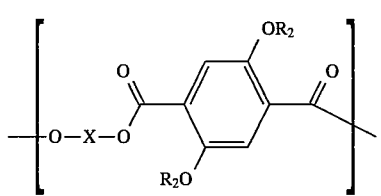

and
repeated units C having the formula:

C (III)

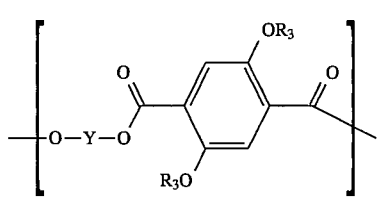

in which $R_1$, $R_2$ and $R_3$ independently stand for n-pentyl or 3-methyl butyl, X and Y are the same or different and each stand for a divalent aromatic or alicyclic hydrocarbon group different from 4,4'-biphenyl, and the molar ratio of A: (B+C) is 1:99 to 99:1, the average sum of the repeating units A+B+C in the polymer molecule being in the range from 20 to 200 and one of two terminal repeated units on the oxy group bearing a hydrogen atom and the other of the two terminal repeated units on the carbonyl group bearing a hydroxyl group.

2. A polyester according to claim 1, characterized in that the divalent aromatic or alicyclic hydrocarbon groups X and Y are selected from 1,5-naphthalene diyl, 2,3-naphthalene diyl, 2,5-naphthalene diyl, 2,6-naphthalene diyl, 2,7-naphthalene diyl, 2,5-biphenyl diyl, 1,4-cyclohexane diyl, 2,2'-bis(4-phenylyl)propane, 2,2'-bis(4-phenylyl)methane, 2,2'-bis(4-phenylyl)oxide, 2,2'-bis(4-phenylyl)sulphide, 2,2'-bis(4-phenylyl)sulphone and 4,4'-stilbene diyl.

3. A polyester according to claim 1, characterized in that it has a weight average molecular weight of 10,000 to 100,000 g/mol.

4. A polyester according to claim 1 or 2, characterized in that it has a weight average molecular weight of 25,000 to 65,000 g/mol.

5. A polyester according to any of claims 1 to 3, characterized in that the group X is the same as group Y and stands for 1,5-naphthalene diyl.

6. A polyester according to any of claims 1 to 3, characterized in that the group X is the same as group Y and stands for 2,3-naphthalene diyl.

7. A polyester according to any of claims 1 to 3, characterized in that the group X is the same as group Y and stands for 2,5-naphthalene diyl.

8. A polyester according to any of claims 1 to 3, characterized in that the group X is the same as group Y and stands for 2,6-naphthalene diyl.

9. A polyester according to any of claims 1 to 3, characterized in that the group X is the same as group Y and stands for 2,7-naphthalene diyl.

10. A polyester according to any of claims 1 to 3, characterized in that the group X is the same as group Y and stands for 2,5-biphenyl diyl.

11. A polyester according to any of claims 1 to 3, characterized in that the group X is the same as group Y and stands for 1,4-cyclohexane diyl.

12. A polyester according to any of claims 1 to 3, characterized in that $R_1$, $R_2$ and $R_3$ each stand for n-pentyloxy.

13. A method of preparing a polyester according to any of claims 1 to 3, characterized in that 2,5-bis(n-pentyloxy)terephthalic acid dichloride and/or 2,5-bis(3-methyl butyloxy)terephthalic acid dichloride is polycondensed by heating in an inert solvent with a mixture of 4,4'-dihydroxy biphenyl and one or more diols having the formula:

HO—X—OH and HO—Y—OH in which X and Y are the same or different and each stand for a divalent aromatic or alicyclic hydrocarbon group different from 4,4'-biphenylyl, and the resulting polymer is then isolated by conventional methods and purified.

14. A method according to claim 13, characterized in that the inert solvent is a chlorinated hydrocarbon or a cyclic or non-cyclic ether.

15. A method according to claim 13, characterized in that polycondensation is brought about at temperatures of 60° to 250° C. and over a period of at least 24 hours.

16. A fiber comprising the polyester according to any of claims 1 to 3.

17. An additive for improving the mechanical properties of fiber-forming matrix polymers comprising the polyester according to any of claims 1 to 3.

18. An additive according to claim 16, wherein the matrix polymer is polyethylene terephthalate.

* * * * *